United States Patent [19]

Lovering

[11] 4,368,517
[45] Jan. 11, 1983

[54] AIRCRAFT LANDING DISPLAY SYSTEM

[75] Inventor: Peter Lovering, Dayton, Ohio

[73] Assignee: Bunker Ramo Corporation, Oak Brook, Ill.

[21] Appl. No.: 138,560

[22] Filed: Apr. 8, 1980

Related U.S. Application Data

[63] Continuation-in-part of Ser. No. 887,388, Mar. 16, 1978, abandoned.

[51] Int. Cl.³ .................... G06F 15/50; G06F 3/153; G06G 7/78
[52] U.S. Cl. .................... 364/428; 73/178 T; 340/729; 364/522; 434/42; 434/43
[58] Field of Search .............. 364/428, 429, 430, 522; 358/103, 104; 340/24, 723, 724, 729; 73/178 T; 434/42, 43

[56] References Cited

U.S. PATENT DOCUMENTS

| | | | |
|---|---|---|---|
| 3,081,557 | 3/1963 | Mailhot | 434/42 |
| 3,242,493 | 3/1966 | Westerback | 434/43 X |
| 3,307,191 | 2/1967 | Crane | 73/178 T X |
| 3,401,228 | 9/1968 | Barnes | 434/43 |
| 3,486,010 | 12/1969 | Pressiat | 364/428 |
| 3,643,258 | 2/1972 | Balding | 73/178 T X |
| 3,668,622 | 6/1972 | Gannett et al. | 340/729 X |
| 3,691,520 | 9/1972 | Nordstrom | 34/27 AT |
| 4,040,005 | 8/1977 | Melvin | 73/178 T X |
| 4,055,004 | 10/1977 | Chase | 434/42 |
| 4,147,056 | 4/1979 | Muller | 73/178 T |

*Primary Examiner*—Jerry Smith
*Attorney, Agent, or Firm*—F. M. Arbuckle; John R. Hoffman

[57] ABSTRACT

A landing display system for indicating to the pilot of an aircraft the relationship between his aircraft and a landing runway includes an aircraft symbol providing attitude information with respect to a reference horizon, a velocity vector indicative of the projected flight path of the aircraft, a descent profile vector indicative of the projected descent path of the aircraft, and a runway symbol in perspective to the aircraft. By reference to these displays the pilot can ascertain not only the present position of his aircraft with respect to the runway, but also the consequences of various corrective maneuvers accomplished with the aircraft.

11 Claims, 21 Drawing Figures

FIG. 2b
POSITION 1
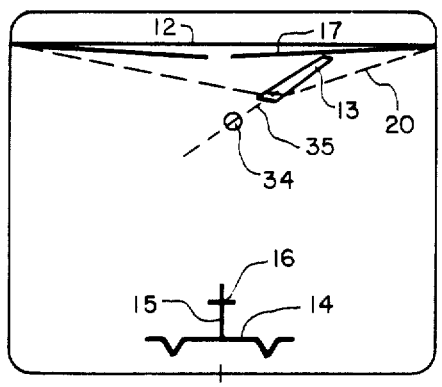
POSITION 2
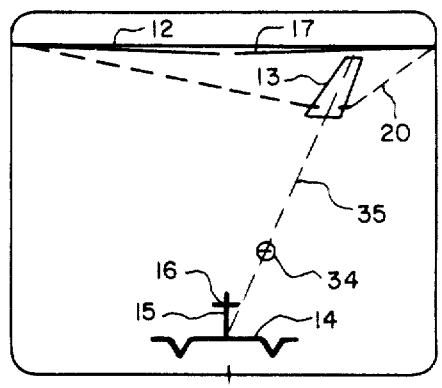
POSITION 3
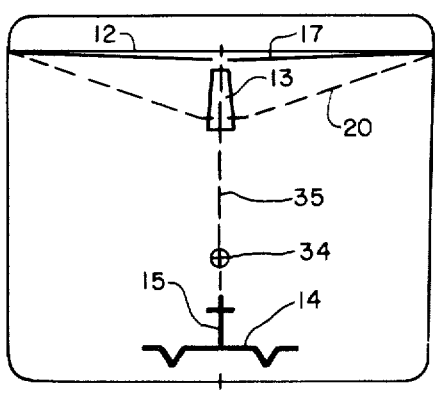
POSITION 4
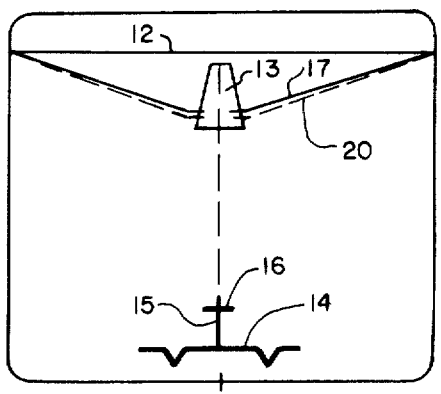
POSITION 5
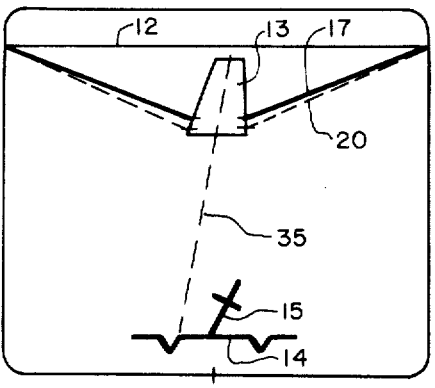
POSITION 6
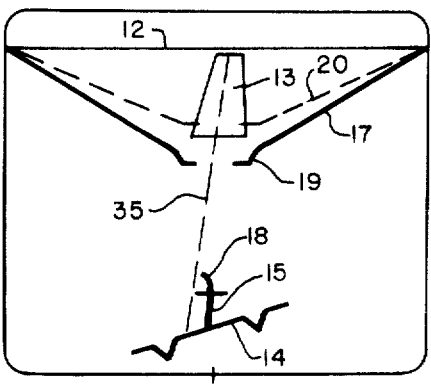

FIG. 2b
POSITION 7
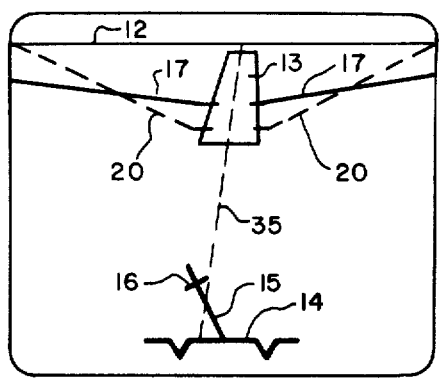
POSITION 8
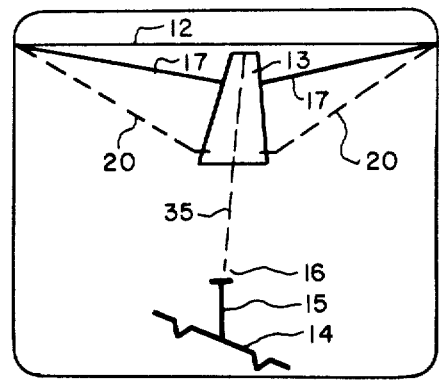
POSITION 9
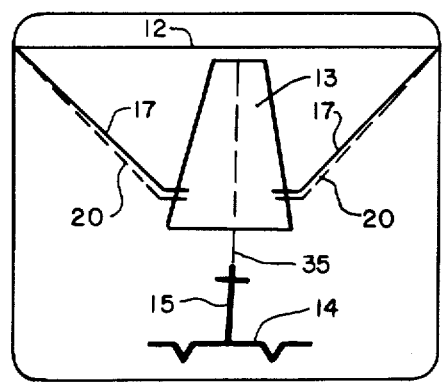
POSITION 10
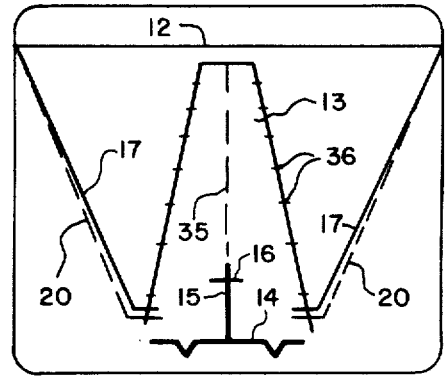
POSITION 11
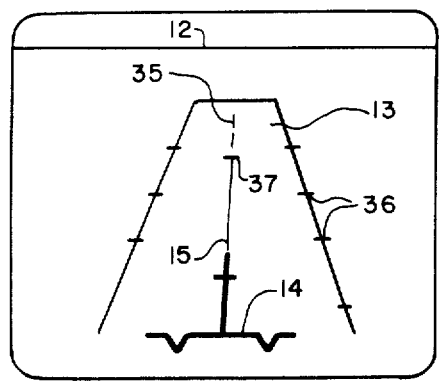
POSITION 12
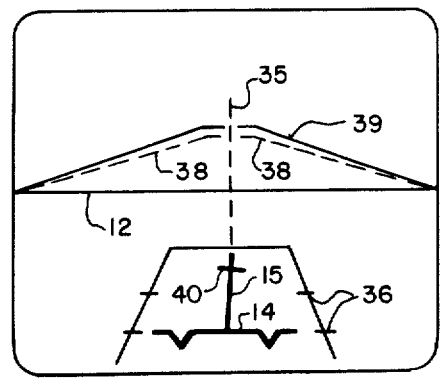

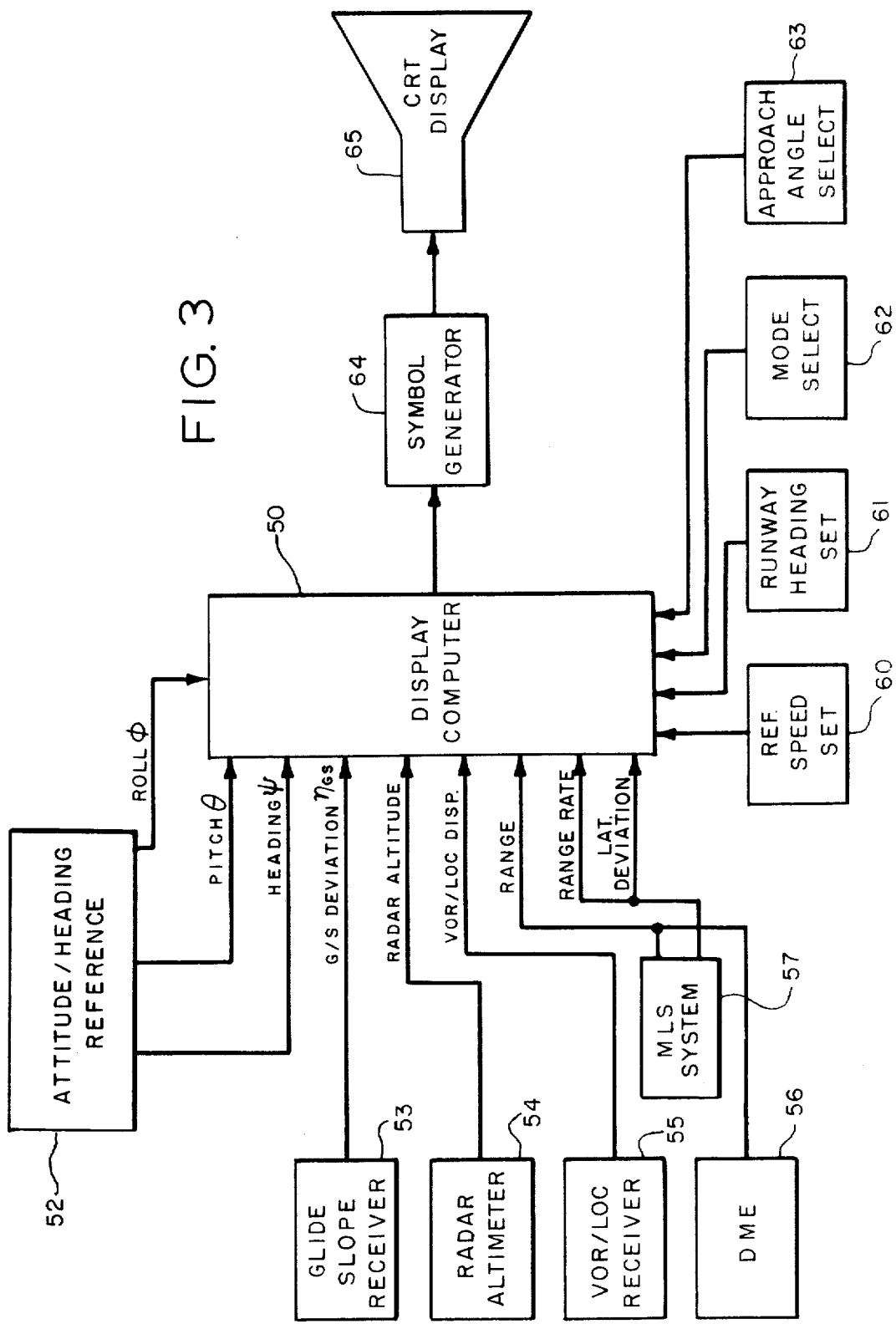

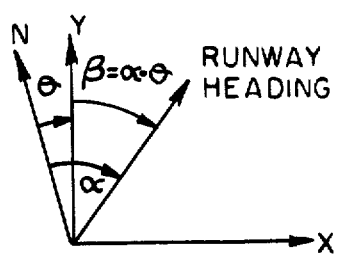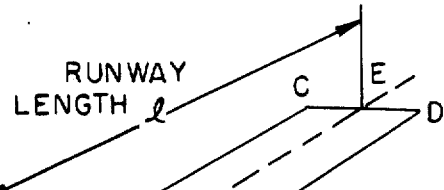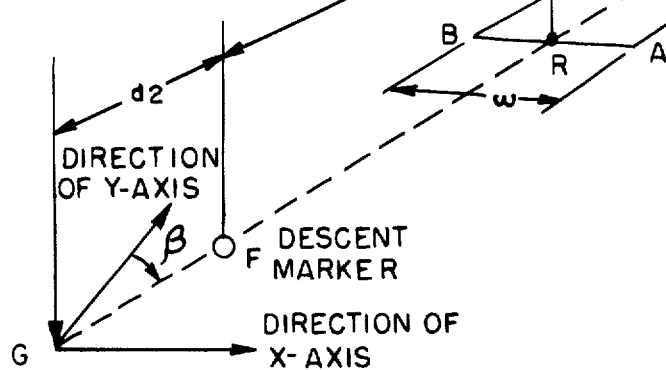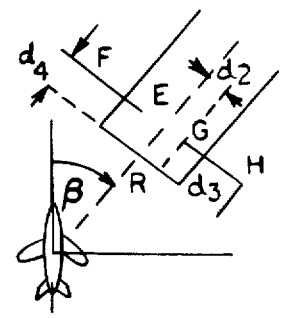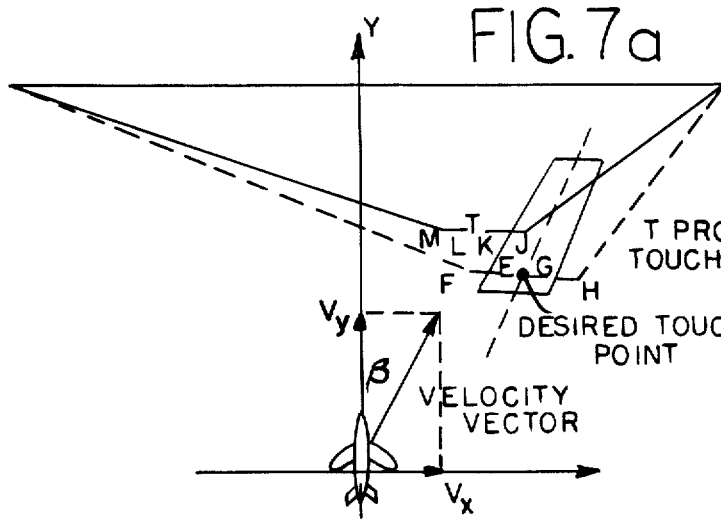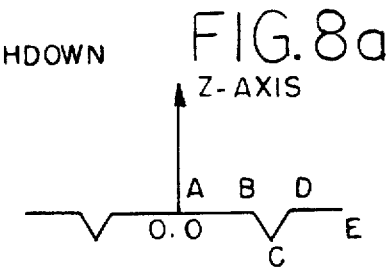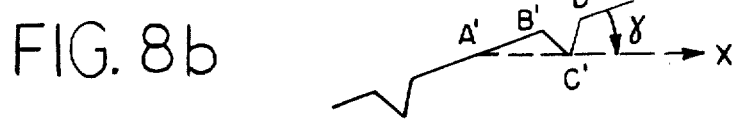

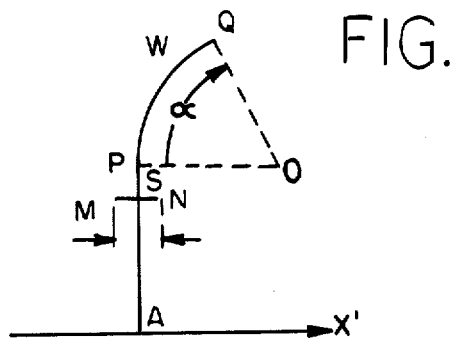
FIG. 9a
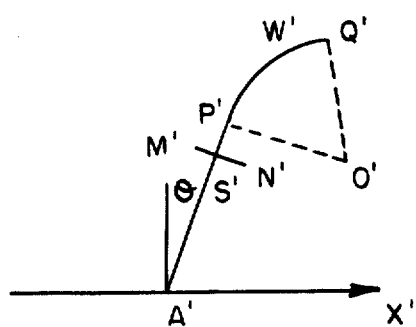
FIG. 9b
FIG. 10
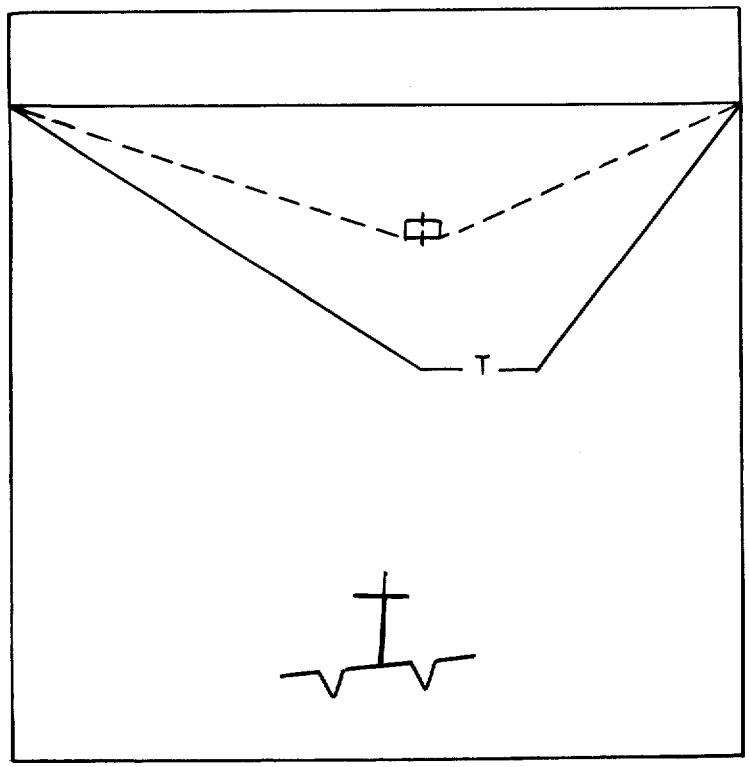
AIRPL HDNG DEG = 10
RWY HDNG DEG = 12
REF POINT 0.2, /5
DIST TO RWAY IN MI = 5
AIRPL ROLL ANGLE DEG= -5
ALTITUDE FT = 3000
RWAY LENGTH MI = 2.75
K0= 1   K1= 7   K2= 7
V1= 0.2  V2= 2   V3= 0.5
DESIRED SPEED = 1.5
LATERAL ACCELERATION- 10
(D<0 TO THE LEFT)
T TOUCHDOWN AT PRESENT SPEED
0.227  2.273

FIG. 11

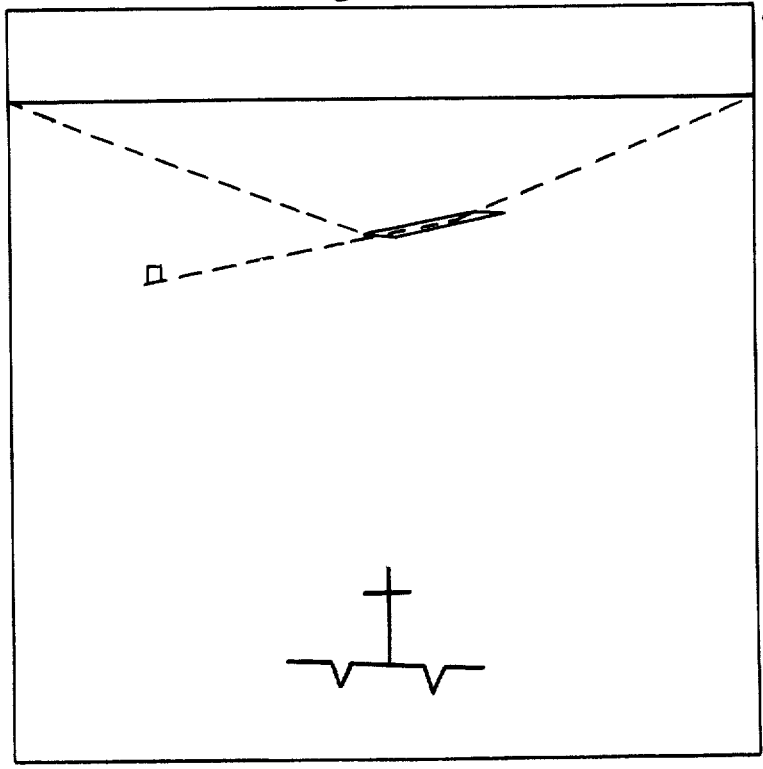

AIRPL HDNG DEG = 0
RWY HDNG DEG = 30
REF POINT 0    5
DIST TO RWAY IN MI = 5
AIRPL ROLL ANGLE DEG = 5
ALTITUDE FT = 3000
RWAY LENGTH MI = 1
K0= 1    K1= 7    K2= 7
V1 = 0    V2 = 1.8    V3 = 0
DESIRED SPEED = 1.5
LATERAL ACCELERATION -30
(D<0 TO THE LEFT)
LEVEL FLIGHT

□ DESCENT MARKER

FIG 12

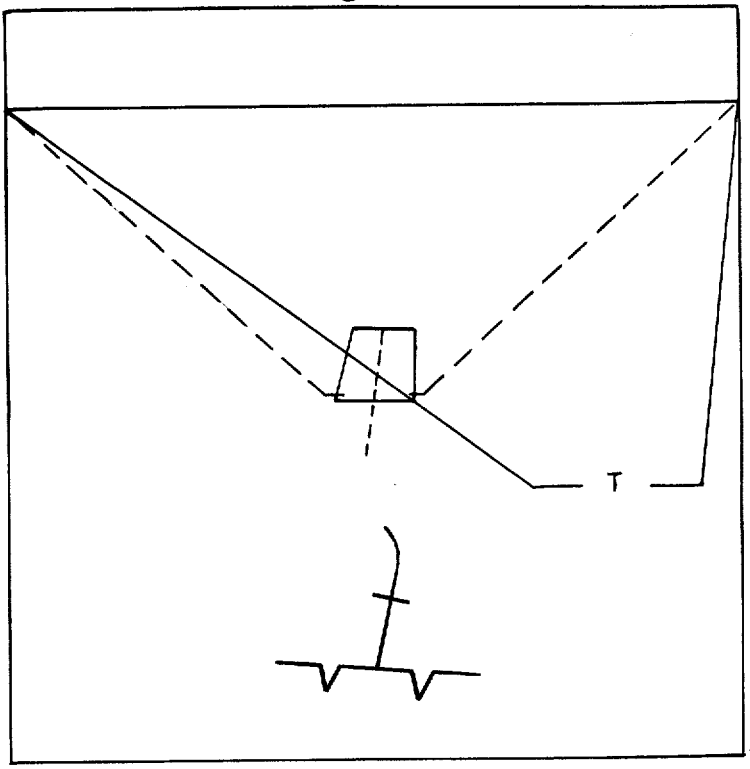

AIRPL HDNG DEG = 10
RWY HDNG DEG = 12
REF POINT 0, 2
DIST TO RWAY IN MI = 2
AIRPL ROLL ANGLE DEG = 5
ALTITUDE FT = 3000
RWAY LENGTH MI = 0.75
K0= 1    K1 = 7    K2= 7
V1= 0.5    V2 = 2    V3 = 0.8
DESIRED SPEED = 1.5
LATERAL ACCELERATION - 50
(D<0 TO THE LEFT)
T TOUCHDOWN AT PRESENT SPEED
0.355  1.420

FIG. 13

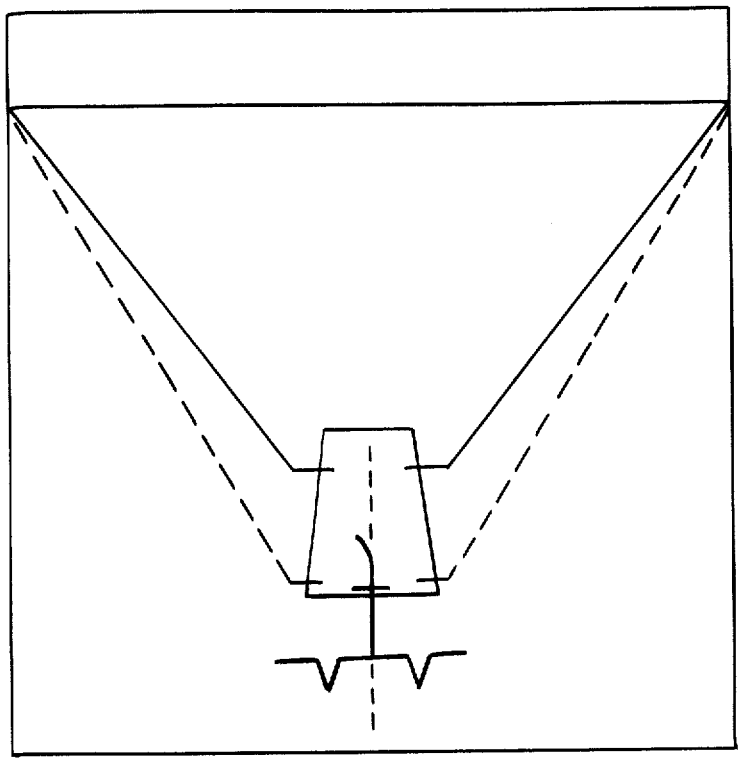

AIRPL HDNG DEG = 10
RWY HDNG DEG = 10
REF POINT 0 , 1
DIST TO RWAY IN MI = 1
AIRPL ROLL ANGLE DEG= -3
ALTITUDE FT = 3000
RWAY LENGTH MI = 2.75
K0=1   K1= 7   K2= 7
V1= 0   V2=3   V3= 0.75
DESIRED SPEED=1.5
LATERAL ACCELERATION -45
(D<0 TO THE LEFT)
T TOUCHDOWN AT PRESENT SPEED
0.000 1.515

FIG. 14

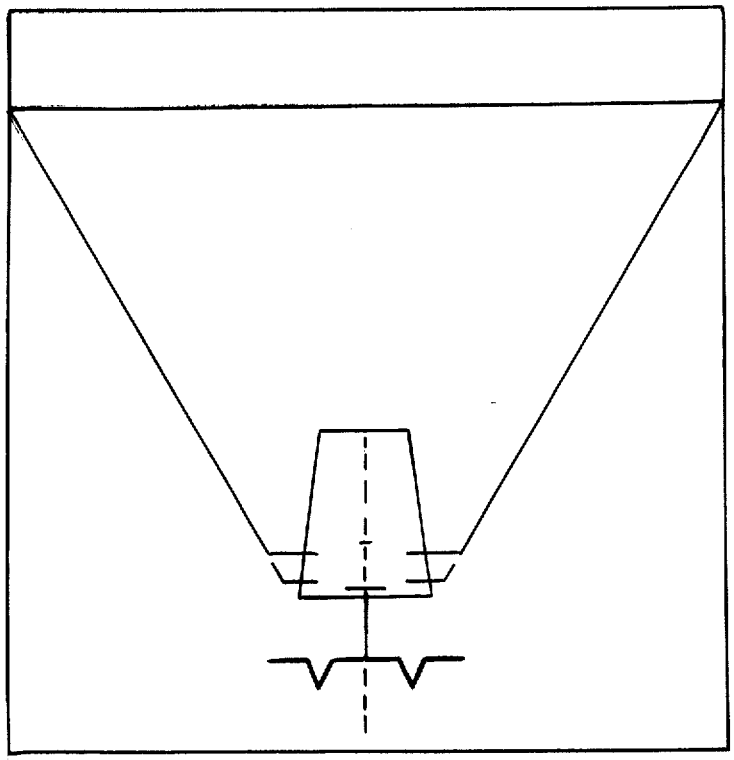

AIRPL HDNG DEG = 10
RWY HDNG DEG = 10
REF POINT 0 , 1
DIST TO RWAY IN MI = 1
AIRPL ROLL ANGLE DEG = 0
ALTITUDE FT = 3000
RWAY LENGTH MI = 0.75
K0=1   K1= 7   K2= 7
V1= 0   V2= 1.5   V3= 0.75
DESIRED SPEED= 1.5
LATERAL ACCELERATION -0
(D<0 TO THE LEFT)
T TOUCHDOWN AT PRESENT SPEED
0 000 1.135

AIRCRAFT LANDING DISPLAY SYSTEM

This is a continuation-in-part of my parent application Ser. No. 887,388 filed Mar. 16, 1978 and now abandoned.

BACKGROUND OF THE INVENTION

The present invention is directed generally to aircraft flight instruments, and more particularly to a display system for use in landing an aircraft under adverse weather conditions.

Various types of flight director systems are presently in use for assisting a pilot in landing in marginal weather conditions. Basically, these systems utilize movable bars, flags or other types of command symbols superimposed on the aircraft artifical horizontal to command the pilot to execute roll and pitch maneuvers required to direct the aircraft to the runway threshold. In the case of an instrument landing system (ILS) runway, the aircraft is first directed by the flight director system to intercept the localizer and glide slope beams, and once these have been intercepted, to perform necessary left and right and up and down maneuvers to follow the beams to the runway.

One drawback of existing flight director systems is that the pilot is relegated to blindly follow the flight director commands, and is not presented with information from which he can readily ascertain the relative position of his aircraft with respect to the runway. Such information is readily ascertained by the pilot during visual approaches, which allows these approaches to be flown with a degree of precision heretofore unobtainable with flight director displays. The inability to be able to independently verify position not only may lead to considerable anxiety on the part of the pilot in low weather minimums, but also may prevent the pilot from modifying the flight director commands to obtain a more confortable and efficient descent profile when abnormal conditions exist, such as unusual winds or intercept angles.

The present invention provides the pilot with a pictorial display which presents the landing runway and projected flight path of the aircraft in true visual perspective as if viewed from the aircraft position whereby the pilot can make approaches with a degree of precision approaching that of visual conditions.

SUMMARY OF THE INVENTION

Accordingly, it is a general object of the present invention to provide a new and improved flight instrument display system for assisting a pilot in accomplishing a landing under adverse weather conditions.

It is a more specific object of the present invention to provide a flight instrument landing display which provides a perspective view of the landing runway together with a projection of the aircraft flight path.

The invention is directed to a landing display system for an aircraft which includes a display device, means for generating on the display device a horizon reference line having a fixed horizontal orientation, and means for generating an aircraft symbol having an orientation with respect to the horizon reference line corresponding to the orientation of the airplane with respect to the actual horizon. Further provided are means for generating a runway symbol in a perspective corresponding to the actual relationship between the runway and the aircraft, and means for generating a descent path profile vector comprising a generally V-shaped symbol extending from either side of the display to respective positions on either side of the projected flight path of the aircraft to indicate to the pilot the projected touchdown point based on the present air speed and rate of descent of the aircraft.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in connection with the accompanying drawings, in the several figures of which like reference numerals identify like elements, and in which:

FIGS. 2a and 2b illustrate typical displays provided by the display system of the invention for particular positions of an aircraft during an ILS approach; and FIG. 3 is a simplified functional block diagram of the display system of the invention.

Appendix

Figure 4A:
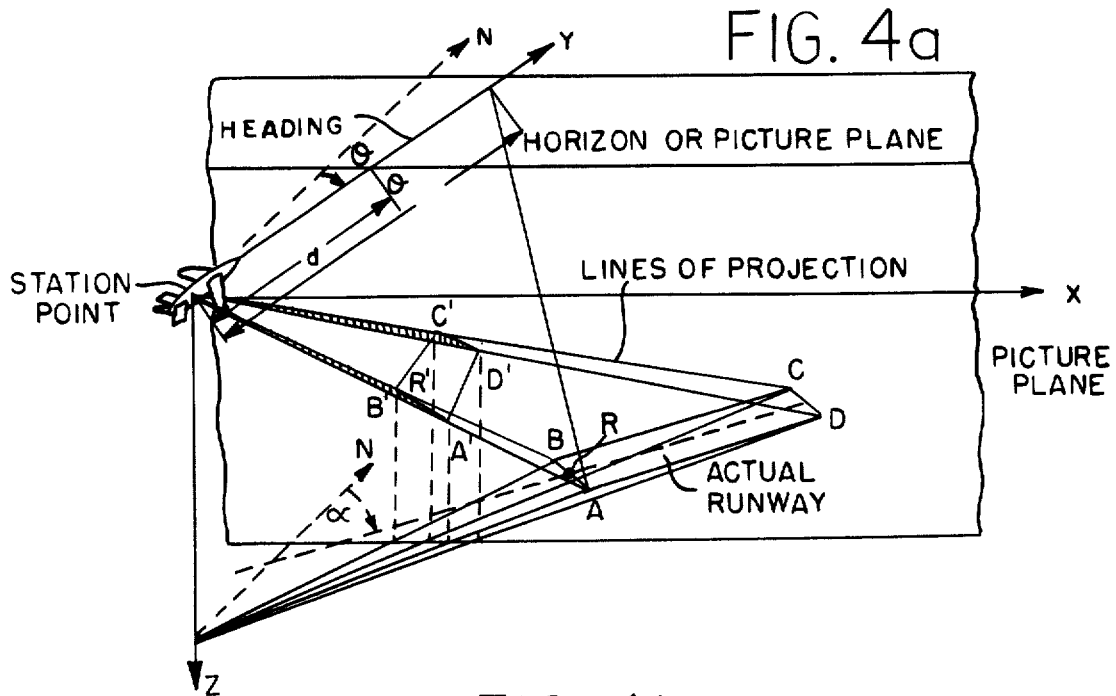
Figure 4B:
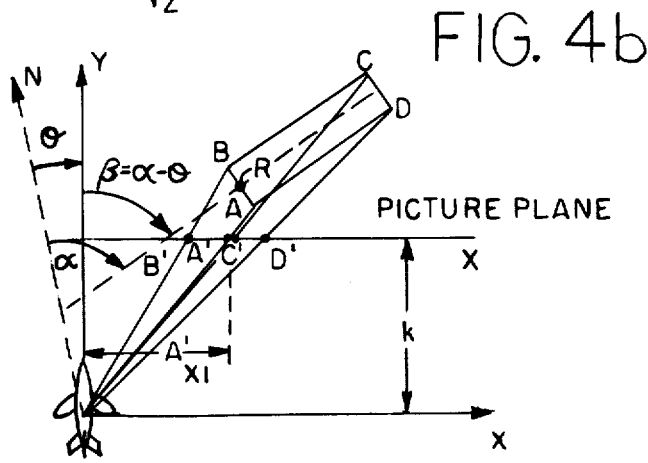
Figure 4C:
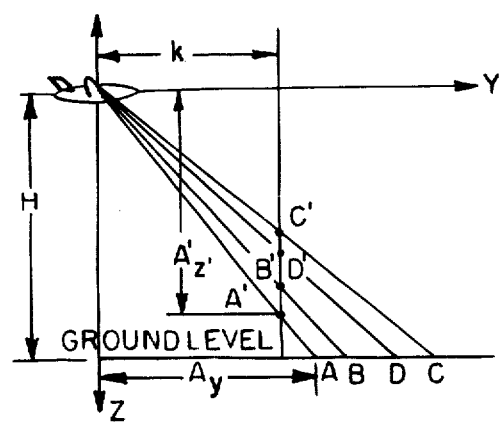
Figure 4D:
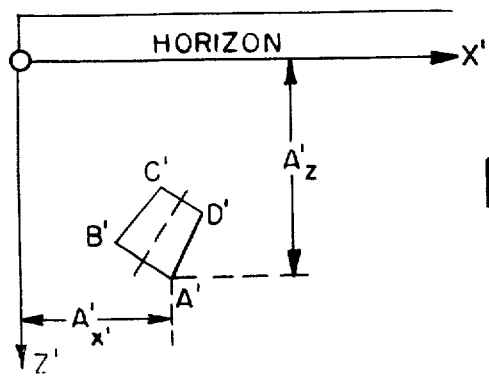

FIG. 4(a) is a schematic illustration providing definitional data for a Cartesian coordinate system used in formulating the mathematical relationships between aircraft movement and runway perspective;

FIG. 4(b) is a plan view of the illustration of FIG. 4(a);

FIG. 4(c) is a profile view of the illustration of FIG. 4(a);

FIG. 4(d) is a picture plane view of the illustration of FIG. 4(a);

FIG. 5 is a schematic illustration depicting certain runway equation variables;

FIG. 6 is a schematic illustration of certain angular relationships representing runway orientation relative to the aircraft.

FIG. 7(a) is a schematic illustration depicting certain touchdown indicator symbols and their geometric relationships;

FIG. 7(b) is a schematic similar to FIG. 7(a) with the aircraft proximate the runway to depict certain detailed dimensional relationships and touchdown indicator symbols;

FIGS. 8(a) and 8(b) are schematic illustrations of the aircraft attitude display symbol, the geometric relation of this symbol to the coordinate system and certain further equation variables;

FIGS. 9(a) and 9(b) are schematic illustrations of the velocity vector display, depicting the equation symbols for this variable;

FIGS. 10–14 are graphical output displays generated by the Hewlett-Packard 9830 computer through arbitrary selection of the input variables as indicated adjacent each display.

DESCRIPTION OF THE PREFERRED EMBODIMENT

Figure 1:
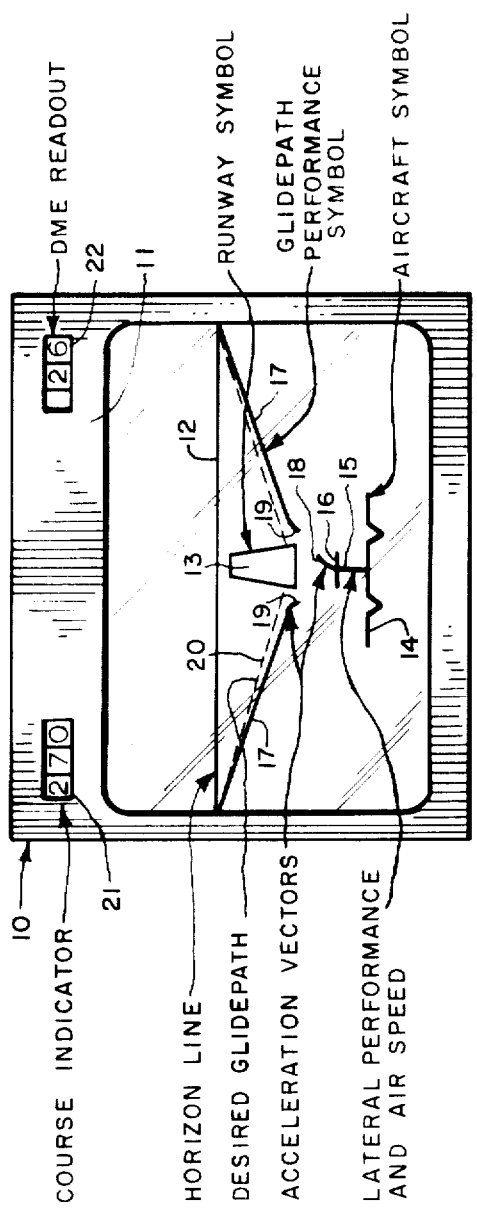
FIG. 1 is a front elevational view of an aircraft landing display system indicator constructed in accordance with the invention.

Referring to the Figures, and particularly to FIG. 1, a landing display system 10 constructed in accordance with the present invention includes a display device 11 arranged for convenient viewing by the pilot. The display device may comprise a cathode-ray tube (CRT) of conventional construction for which power supply and deflection circuits (not shown) also of conventional construction are provided.

The display presented to the pilot on display device 11 includes a horizon attitude reference symbol in the form of a horizontal line 12. Below this horizon reference line a runway symbol 13 is presented in size and perspective as if representing the actual runway viewed from the aircraft. These two symbols are combined with an aircraft symbol 14 below the runway symbol to provide a real world display from which a pilot can readily ascertain the attitude of his aircraft and the progress of his approach. That is, viewing only the display device 11 the pilot sees the runway, horizon and his aircraft *as if viewed from a position in space detached from his aircraft.*

The projected lateral flight path of the aircraft is also depicted on the display device by means of a vector 15 emanating from the top of the aircraft symbol 14. The length of this vector preferably corresponds to the relative air speed of the aircraft, and the desired approach reference speed, as determined and preset by the pilot for the aircraft landing weight and landing flap setting, or as determined automatically from these parameters by means of an on-board computer, is depicted by a mark 16 along this vector.

The projected vertical flight path of the aircraft is depicted by two lines 17 emanating downwardly from the sides of the display, adjacent each end of the horizon reference line 12. These two lines form a disjointed V which indicates to the pilot the descent path and touchdown point of his aircraft if the present rate of descent, course and air speed are maintained. When the aircraft is aligned with the runway, the intersection of lines 17 with runway symbol 13 indicates the projected touchdown point of the aircraft on the runway.

In further accord with the invention, the horizontal velocity vector 15 and glide slope vectors 17 preferably each include at their projecting ends acceleration indicating portions 18 and 19, respectively. These acceleration indicating portions point in the direction of increasing rate, or acceleration, either left or right in the case of velocity vector 15 to indicate lateral acceleration or up and down in the case of descent profile vectors 17 to indicate increasing or decreasing rates of descent. This information is highly useful to the pilot, since it provides an early indication of changes in aircraft velocity, which enables an approach to be flown with greater precision.

The flight display instrument 10 may also include heading and DME read-out windows 21 and 22 of conventional design. Since the functions of such read-outs are conventional and familiar to those acquainted with the art, these elements are not covered herein.

Figure 2A:
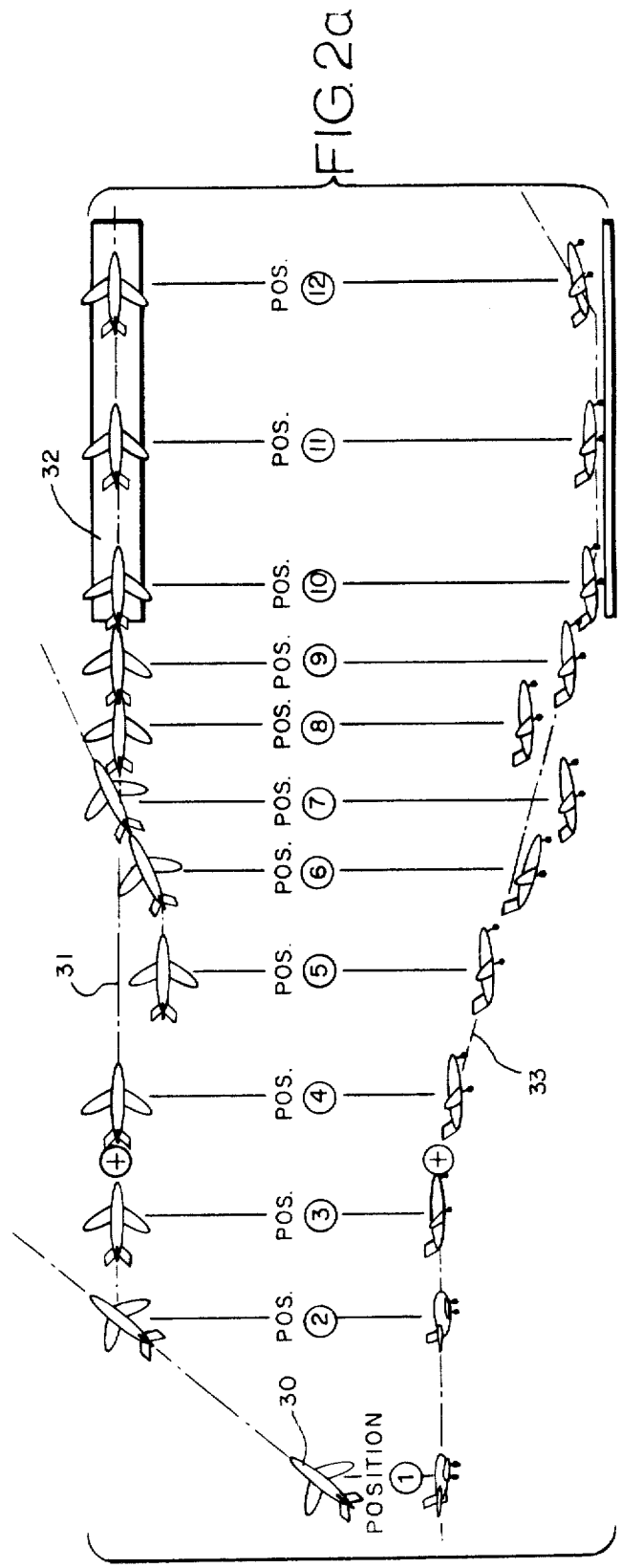

The operation of the flight instrument display system of the invention is illustrated in FIGS. 2*a* and 2*b* for a series of twelve different aircraft positions which may typically occur during an ILS approach. FIG. 2*a* illustrates both the lateral position of an aircraft 30 with respect to the center line 31 of a landing runway 32, and the vertical position of the same aircraft with respect to a desired descent path 33 to the same runway. Positions 1-12 of the aircraft correspond to on-course and off-course situations typical for the landing approach. FIG. 2*b* illustrates the display presented to the pilot on display device 11 for each of the ten aircraft positions.

In position 1 the aircraft 30 is at a desired intercept altitude and is on an intercept heading with respect to the center line of runway 32. The velocity vector 15 emanating from the aircraft symbol 14 indicates that if the aircraft continues on its present course the center line will be intercepted at a point outside of the point of initial descent, as indicated by the cross-hatch marker 34 on the runway centerline projection 35. The aircraft symbol 14 is level and the projected descent vector 17 is approximately on the horizon reference line 12, indicating that the aircraft is in straight and level flight. The velocity vector 15 extends substantially beyond marker 16, indicating that the air speed of the aircraft is considerably higher than the desired approach reference speed.

Assuming the aircraft continues on the leading depicted in position 1, the runway center line is eventually intercepted, resulting in the display shown in FIG. 2*b* for position 2. Now, the runway symbol 13 has changed such that the center line 35 of the runway extends to the aircraft symbol 14, indicating that the aircraft is on the center line. However, the projected flight path as depicted by velocity vector 15 is not down the runway, and if the aircraft continues on this course it will pass to the left of the runway. The fact that the aircraft symbol 14 is level and the descent vectors 17 are still adjacent the horizon reference line 12 indicates that the aircraft is still in straight and level flight. The reduction in length of the velocity vector 15 compared to the previous display shown for position 1 indicates that the aircraft has slowed to an air speed just about the desired approach speed. The point of initial descent, as depicted by marker 34, now lies between the point of intercept of the center line and the approach end on runway 13. Vectors 20 indicate the desired descent profile to the runway.

Assuming that the aircraft is turned to the runway heading, the pilot will be presented with the display shown in FIG. 2*b* for position 3. In this instance, the velocity vector 15 is aligned with the center line 35, indicating that the aircraft is flying toward the runway. Since the point of initial descent still lies ahead of the aircraft, descent is not yet taking place, as indicated by the descent vectors 17 being positioned at the horizon reference line 12.

Continuing on the runway heading, the aircraft reaches the selected point of descent and the pilot is presented with the display shown in FIG. 2*b* for position 4. Descent is now initiated, with the pilot adjusting power and pitch attitude until his projected descent path 17 corresponds closely to the desired descent profile 20, as shown. If the aircraft were to continue on this descent path a successful touchdown at the desired touchdown point would occur.

However, assuming that a cross wind exists causing the aircraft to drift to the right of the runway center line, as depicted by aircraft 30 in position 5, the pilot is presented with the display shown in FIG. 2*b* for that position. Although the aircraft symbol 14 remains level, the velocity vector 15 indicates drift to the right. The center line 35 of the runway now lies to the left of the aircraft symbol indicating to the pilot that the aircraft is right of course. Since the descent rate has not been altered, descent vectors 17 still correspond closely to the desired descent vector 20. Uncorrected, this situation would result in a touchdown at a point to the right of the runway.

In position 6 the pilot has taken corrective action by banking the aircraft to the left. Accordingly, in FIG. 2*b* the aircraft symbol 14 is shown banked and the velocity vector 15 associated therewith is now directed toward the runway with an acceleration indicated on its tip portion 18 for an intercept course with the center line. As this bank is continued, the acceleration vector will eventually extend through the center line, allowing the pilot to roll out to a wing level condition as shown in FIG. 2b for position 7. Maintaining this heading will result in the aircraft again becoming centered on the center line, at which time it will be necessary for the pilot to bank the aircraft to the right until the velocity vector 15 is again aligned with the runway center line, as depicted in position 8. By maintaining vector 15 in alignment with center line 35 the cross wind is automatically compensated for so no further drift to the right of the runway will occur.

In position 6 it should be noted that the pilot has allowed the aircraft to descend below the desired flight path 33, with the result that if descent is continued at the then occurring descent rate the aircraft will land short of the runway, as indicated by descent vectors 17 in FIG. 2b for position 6. It should also be noted that the acceleration tip portions 19 of descent vector 17 indicate an increasing descent rate. If this situation is not corrected a successful landing will not be made.

In position 7 the pilot has realized his potential short landing, and has changed pitch and added power to obtain a lower descent rate. As shown in FIG. 2b for position 7, this will result in a touchdown point down the runway from the desired touchdown point. Also, by the fact that the descent profile vectors 17 no longer emanate from the ends of the horizon reference line 12, and cross the desired descent path vectors 20, the pilot is made aware that his present descent path is shallower than the desired path. Continued operation and landing with this descent rate could require excessive braking at touchdown to avoid running off the far end of the runway. To avoid this, the pilot continues the shallow approach angle only until he is again in a position to resume the desired approach angle to the desired touchdown point. This position is reached at position 8, wherein the descent vectors 17 again emanate from the ends of the horizon reference line 12. At this point, it is merely necessary for the pilot to adjust pitch and power to re-establish the descent such that the descent profile vectors 17 again correspond to the desired descent profile vectors 20, as shown in FIG. 2b for position 9.

In position 9 the aircraft is re-established on the runway center line and on the desired descent profile 33. Continued operation in this condition will result in a successful touchdown at the desired touchdown point. It should be noted that at this time the aircraft symbol 14 is aligned on the runway center line 35, velocity vector 15 extends along the center line, and the descent profile vectors 17 and 20 are closely aligned.

Assuming aircraft 30 continues the approach from position 9 a position 10 over the approach end of runway 32 is reached. As shown in FIG. 2b, the pilot is now presented with a display wherein the guidelines of the runway symbol 13 extend to either side of the aircraft symbol 14, indicating that the aircraft is over the runway. Velocity vector 15 continues to point down the center line 35 and air speed marker 16 continues to indicate an air speed slightly above reference. The projected touchdown point as indicated by descent profile vectors 17 corresponds closely with the desired touchdown point, as indicated by the desired descent profile vector 20. At this time distance markers 36 may be displayed along either edge of the runway to indicate to the pilot runway distance remaining. Typically, these markers may indicate 1000 foot segments of runway remaining, the pilot at position 10 seeing seven such markers for 7000 feet of runway remaining.

After touchdown and during roll out, the descent vectors are no longer generated. The pilot is now presented with an expanded runway symbol 13 wherein the side markers 36 indicate distance remaining. The length of velocity vector 15, instead of indicating air speed, may now indicate the projected stopping distance of the aircraft for its present rate of deceleration. In FIG. 2b for position 11 an end marker 37 is provided at the end of the velocity vector to indicate that the projected stopping point is being displayed, in this case the last 1000 feet of the runway. As the pilot brakes more heavily, vector 15 becomes shorter, indicating a closer stopping point. Should the aircraft veer off the center line of the runway, this would be indicated by the velocity vector 15 moving away from coincidence with center line 35.

In the event of a go-around, as depicted in position 12, a desired climb profile vector 38 in the form of a disjointed inverted V appears above the horizon line 12, as shown in FIG. 2b for position 12. The pilot now raises the nose of the aircraft and adds power until the projected climb profile 39 corresponds to the desired climb profile 38. The runway center line 35 now extends beyond the end of the runway to provide lateral guidance during initial portions of the climb-out. As in the previously described displays, the aircraft velocity vector 15 provides an indication of direction and velocity, and it is incumbent on the pilot during this maneuver to maintain the velocity vector 15 in alignment with center line 35. An air speed marker on the velocity vector provides an indication of desired initial climb speed.

Referring to FIG. 3, operation of the system is centered around a display computer 50 which analyzes the performance of the aircraft and controls indicator 10. Basically, the inputs provided to computer 50 include pitch, roll and heading information from an on-board attitude/heading reference source 52, which may be of conventional construction, and, in the case of an ILS-based application glide slope deviation information from a glide slope receiver 53, altitude information from a radar altimeter 54, and VOR/localizer deviation information derived from a VOR/localizer receiver 55. DME information indicating distance to touch-down may be provided from a DME receiver 56.

Where the present system is utilized in conjunction with a microwave landing system (MLS), the localizer receiver 55 and DME receiver 56 may be supplemented by a single MLS receiver system 57 which provides range, range rate and lateral deviation parameters.

It is necessary that the pilot input to display computer 50 include the final approach or reference speed, which may be entered through circuit 60, and the runway heading, which may be entered through circuit 61. The operating mode of the display is manually set by means of circuit 62, and the desired approach angle may be entered through circuit 63.

To condition the outputs of display computer 50 for presentation, the output of the computer may be applied to a symbol generator circuit 64 wherein the various symbols of the display are generated in a composite video signal. Alternatively, this symbol generator may be incorporated in the computer. The video signal generated by symbol generator 64 drives a cathode-ray tube (CRT) display 65 which is preferably positioned immediately in front of the pilot for convenient viewing. It will be appreciated that the CRT display can be constructed in various sizes and shapes as the application requires, and may in appropriate instances operate as a "heads-up" display for viewing through the aircraft windshield. Also, the CRT display may be either a monochrome display or a color display, in the latter case the various symbols and background areas being presented in different colors for increased intelligibility to the pilot.

The present invention constitutes an improvement over prior art flight director systems in that the pilot is presented with a single display containing information from which he can assess not only the present altitude and deviation of his aircraft from a desired flight path, but also the projected performance of his aircraft during subsequent phases of the approach. Thus, the pilot is presented the complete situation from which he can make reasoned decisions as to the performance of his aircraft and the successful completion of the approach.

While the instrument landing display system of the invention has been shown from an initial approach phase, as depicted by position 1, to a go-around phase, as depicted by position 12, it will be appreciated that indicator 11 would be utilized during other regimes of flight for attitude and navigation purposes. For example, it is contemplated that aircraft symbol 14 and horizon line 12 would be displayed at all times to provide the pilot with basic attitude information. Also, the velocity vector 15 and descent profile vectors 17 would continue to provide useful information for lateral and vertical guidance of the aircraft. It is contemplated that the desired profile vectors 20 could be utilized during climb and descent for guidance, and that a desired flight path symbol similar to the runway center line symbol 35 could be provided to indicate the center line of an airway or a desired course.

Exemplary mathematical methods which may be used in association with any general purpose computer or microprocessor to generate signals suitable to produce the described display features on conventional CRT or other graphic display device are outlined below. There follows as well a further discussion of the means by which known aircraft sensors may supply the required data inputs for the computer or microprocessor. An exemplary program listing and representative display graphics as obtained from a Hewlett Packard 9830 desk top computer are also set forth. All of the data input information, the mathematical relationships and the computer processing techniques are well-known to those of ordinary skill in the art and form no part of the present invention. Such information is offered by way of example and is not intended as a limitation on the invention as to particular formulae, computers or computational technique. Those skilled in the art will recognize that a variety of other specific formulae, computers and computational techniques may be used consistent with the teachings of the present invention.

A reference coordinate system for developing a prospective presentation of the runway by known mathematical techniques may be a conventional x, y, z coordinate system except that for convenience the z-axis is directed oppositely to the normal z-axis notation. This enables use of positive values representing altitude for z-axis dimensions, well-known geometric construction techniques for generating a prospective presentation are described, for example, in French and Vierck, "Engineering Drawing", McGraw-Hill (ED.8, 1953). For simplicity, the earth is considered to be flat plane, and the origin is located at the pilot's position in the airplane. The z-axis is perpendicular to the ground and along the gravitational vector. The y-axis is perpendicular to the z-axis and points in the direction of heading of the aircraft. The x-axis is through the origin and perpendicular to both the y-axis and z-axis, with positive direction to the right.

The parameters needed by the display processing are readily developed from the on-board aircraft sensors. The individual input parameter requirements for the distances from the aircraft (A/C) to a runway reference point are represented as follows, with reference to FIG. 4a:

Ry = y-axis distance component of a vector drawn from origin to reference point R.

Rx = x-axis distance component of the vector from origin to point R.

Rz = z-axis distance component of the vector from origin to point R.

The straight line distance from the aircraft to the azimuth angle transmitter can be obtained in the MLS (microwave landing system) environment, from a precision DME (distance measuring equipment) transmitter assumed here to be co-located at the azimuth angle transmitter site. Current specifications call for ±50 foot accuracies using DME. There is a possibility that DME will be installed instead at the elevation angle transmitter site located opposite the point at which the approach slope intersects the runway surface. An appropriate offset can be introduced into the system to make the DME show straight line distance (Slant Range) from the aircraft to the desired touch point in either case, mathematically denoted by the following vector equation:

$$\underline{R} = \underline{D_I} + \underline{D_r}$$

where the sub-bars denote vector quantities $\underline{R}$ = vector from aircraft origin to reference point on the runway = (Rx, Ry, Rz)

$\underline{D_r}$ = vector from Az transmitter to touchdown point introduced through aux data channel of MLS $\underline{D_I}$ = DME vector from MLS transmitting site to aircraft A similar, though less accurate distance measurement, can be obtained from existing ILS by co-locating the DME at either of the same transmitter sites; this has been implemented at several airports. Use of standard DME would probably increase pilot workload for approach setup. Both distance measuring sets are aircraft transponders measuring the time interval required for an airborne interrogator pulse to travel to the DME site and trigger a return pulse to the aircraft, as is well known in the art.

Rx, i.e., the distance component along the axis sideways to A/C (lateral off course distance) is obtained from either the MLS or ILS azimuth (localizer) receiver and transmitted to a Course Deviation Indicator at a scale factor of 60 Mv/degree. This input can be conditioned, utilizing the above range information, and used to displace the runway symbol left or right of display center to display the aircraft's lateral position (in feet) to the runway centerline extended.

At MLS locations, absolute height above the landing surface, i.e., Rz-vertical distance, is derived in the airborne system using elevation angle from the ground transmitter and distance.

Lacking three axis space positioning provided by the MLS, earlier techniques used for the determination of height in ILS applications included use of radio or radar altitude. The main drawback to these devices is irregular terrain in the approach zone. Absolute altitude accuracy improves, however, as the aircraft reaches the runway overrun and the runway itself where accuracy to within inches is achieved.

Another alternative, lacking the MLS is use of QFE altimeter settings for the approach system so that the altimeter or Air Data computer measures height above field elevation.

The individual input parameter requirements for the aircraft velocity components for x, y, z axes are represented as follows:

$V_y$ = velocity along heading axis
$V_x$ = velocity along wing axis
$V_z$ = velocity along vertical axis (altitude)

The lateral component velocity ($V_x$) can be determined from beam rate sensors. Output from the sensors can be used directly or complemented with lateral rate signals from a conventional inertial guidance platform if the aircraft is so equipped.

Range rate ($V_y$) is derived for display purposes in the MLS airborne equipment. This data, though somewhat less accurate, may be obtained from standard DME. Inertial navigation systems also provide a groundspeed output.

Vertical velocity ($V_z$) is one of the standard outputs from air data computers and used to drive a pilot's vertical velocity indicator. Vertical rate and acceleration signals are also available from the inertial platform.

Aircraft Roll Angle ($\gamma$-rotation of wing about longitudinal axis of A/C) is available from electrically driven attitude indicators or ADIs (Attitude Director Indicator). These indicators receive roll attitude information from an attitude gyro such as the MD-1 or from a gyro platform.

Lateral or sideways acceleration of the aircraft ($a_x$) can be obtained from lateral accelerometers such as those used in many automatic flight control systems or from an inertial navigation system. In more austere systems, the first derivative of beam rate can be computed to provide the value. In the latter case beam stability must be assumed since lateral beam rate or acceleration could be caused by movement of either the aircraft, beam or a combination of both.

As earlier explained, the fundamental display requirement is to provide a perspective view to the pilot. Mechanical engineering texts, such as the French and Vierck text earlier cited, give geometric construction methods by which the perspective view is obtained. In creating a perspective drawing, a geometric construction is followed which creates the view seen by an observer through an imaginary plane of projection. This plane is called the picture plane. The position of the observer's eye is called the station point, as shown in FIGS. 4(a)-4(d) presently to be explained in detail. The top and side views of the object to be displayed (FIGS. 4(b) and (c)) are used as the basis of the construction. For each of the two views of the runway, the picture plane and station point is shown. The construction of the perspective view is accomplished by drawing the visual ray from the station point, through the picture plane, to each point of the symbol in both the top and side views. For each point, a projection line is drawn from the intersection of the visual ray with the picture plane. The intersection of the vertical projection from the side view gives the corresponding point in the perspective view. Connecting the intersection of the lines of projection gives the perspective view. The coordinates of the object in the perspective view are proportioned to the relationship of orthogonal projection view with the picture plane and the station point. This geometric relation is capable of simple mathematic expression for each point of an object. The application of these geometric methods to generate the runway perspective view is shown schematically in FIGS. 4(a)-4(d). These figures depict the definition of the Cartesian coordinate system with the relation of the pilot's view to the picture plane (FIG. 4(a)) and as well illustrates the plan view (FIG. 4(b)), the profile view (FIG. 4(c)) and the picture plane view of the runway (FIG. 4(d)). Definitions of the mathematical symbols used are as follows;

(1) A point is identified as a capital letter. Its x, y, z coordinates are designated in vector notation as $\overline{A} = (A_x, A_y, A_z)$, using point "A" in FIG. 4 as an example. The sub-bar designates the point as a vector referenced to the origin.

(2) Cartesian coordinates axes are designated in small letters, e.g., x, y, z. Different sets of coordinate systems may be distinguished by primes, e.g., x', y', z'.

(3) Distances are designated by small letters, e.g., d, r, $x_1$, $x_2$, etc.

(4) Points representing the runway in the picture plane are designated with primes. Thus, point A in physical space would be $\overline{A} = (A_x, A_y, A_z)$. Point A in the perspective two-dimensional drawing having axes x' and z' would be designated $\overline{A'} = (A'_{x'}, A'_{z'})$.

(5) Angles are designated with Greek letters in general, e.g., $\alpha$, $\beta$, $\gamma$. However, $\rho$ (rho) is used as the radius of curvature.

(6) I is a general index to represent a set of points: $\overline{I} = (I_x, I_y, I_z)$.

As an example, for point A, the projection on the picture plane has the proportion $$A'_{x'} = (K/A_y)A_x$$

The distance from the observer (origin) to the picture will be taken as the actual distance d multiplied by a scaling factor f, so that K, the scaled distance, is given by K = fd where f is the picture size scaling factor. Similarly, the z dimension for point A, has the proportionality equation:

$$A'_{z'} = K(A_z/A_y)$$

For simplicity in this analysis $A_z$, the runway altitude, will be taken to be zero. Any point may be treated similarly to point A, so that if I designates a general point, then $$I'_{x'} = K(I_x/I_y)$$

$$I'_{z'} = K(I_z/I_y)$$

Thus, any 3-dimensional object may be mapped point-by-point into the picture plane by means of such equations.

The equations for the runway symbols are developed as follows. In FIG. 5, R is the runway reference point, ABCD are runway corner points, $d_1$ is the distance to descent marker from point R, and $d_2$ is the distance by which the center line is extended from R. l, w, $d_1$, $d_2$ are pre-programmed constants, where l=runway length and w=runway width. R is a reference point calculated from the known runway position and the estimated aircraft position:

$$R=(R_x, R_y, R_z) \text{ where } R_z=H \text{ (aircraft altitude)}$$

Referring to FIG. 6, $\beta=\alpha-\theta$ where $\theta$=aircraft heading and $\alpha$=heading of runway. This yields the following equations in our selected Cartesian coordinate system:

| Pt | x - Equation | y - Equation |
|---|---|---|
| A | $A_x = R_x + \frac{w}{2}\cos\beta$ | $A_y = R_y - \frac{w}{2}\sin\beta$ |
| B | $B_x = R_x - \frac{w}{2}\cos\beta$ | $B_y = R_y + \frac{w}{2}\sin\beta$ |
| C | $C_x = R_x + l\sin\beta - \frac{w}{2}\cos\beta$ | $C_y = R_y + l\cos\beta + \frac{w}{2}\sin\beta$ |
| D | $D_x = R_x + l\sin\beta + \frac{w}{2}\cos\beta$ | $D_y = R_y + l\cos\beta - \frac{w}{2}\sin\beta$ |
| E | $E_x = R_x + l\sin\beta$ | $E_y = R_y + l\cos\beta$ |
| F | $F_x = R_x - d_1\sin\beta$ | $F_y = R_y - d_1\cos\beta$ |
| G | $G_x = R_x - (d_1 + d_2)\sin\beta$ | $G_y = R_y - (d_1 + d_2)\cos\beta$ |

The equations for the picture plane with K as the scaling factor are as follows:

| Point | x - Equation | y - Equation |
|---|---|---|
| A' | $A'_{x'} = K\,A_x/A_y$ | $A'_{z'} = K\,H/A_y$ |
| B' | $B'_{x'} = K\,B_x/B_y$ | $B'_{z'} = K\,H/B_y$ |
| C' | $C'_{x'} = K\,C_x/C_y$ | $C'_{z'} = K\,H/C_y$ |
| D' | $D'_{x'} = K\,D_x/D_y$ | $D'_{z'} = K\,H/D_y$ |
| E' | $E'_{x'} = K\,E_x/E_y$ | $E'_{z'} = K\,H/E_y$ |
| F' | $F'_{x'} = K\,F_x/F_y$ | $F'_{z'} = K\,H/F_y$ |
| G' | $G'_{x'} = K\,G_x/G_y$ | $G'_{z'} = K\,H/G_y$ |

Using the equations developed with $\beta=\alpha-\theta$, and point-by-point mapping equations (2) above, the computer determines the display coordinates for the cathode ray tube beam, using point "A" as an example as follows:

$$A'_{x'} = K\frac{R_x + (w/2)\cos\beta}{R_y - (w/2)\sin\beta} \quad A'_{z'} = K\frac{H}{R_y - (w/2)\sin\beta}$$

The display tube generates the runway symbol in a conventional manner by intensifying the beam while generating x and z deflection voltages proportional to $B'_{x'}-A'_{x'}$ and $B'_{z'}-A'_{z'}$. This is the role of the symbol generator. Letting $S_x$ and $S_z$ be the CRT deflection sensitivities in volts per unit deflection in the x and z directions respectively, the deflection voltages produced by the symbol generator in drawing a line from A to B are $$E_x(t)=S_x(B'_{x'}-A'_{x'})r(t)$$

$$E_z(t)=S_z(B'_{z'}-A'_{z'})r(t)$$

where r(t) is a unit ramp function defined by:

$$r(t) = t/T \text{ for } 0 \leq t \leq T$$
$$= 0 \text{ otherwise}$$
$$T = \text{total time to draw line}$$

The symbol generator is thus defined as a device which receives pairs of points to be connected by a straight line, and converts the straight line data into voltages (digital to analog converter) for deflection of the CRT beam.

The desired touchdown point is at a programmed distance from the front edge of the runway on the center line. The horizon is represented as a horizontal line at a fixed distance from the top of the display. It is a relatively simple task to draw this display since the desired runway touchdown point and the ends of the horizon are known. FIG. 7 provides the geometric relations for the points on the touchdown indicators from which the computer equations are developed. The equations in matrix format are as follows:

$$\begin{bmatrix} E_x E_y \\ F_x F_y \\ G_x G_y \\ H_x H_y \end{bmatrix} = \begin{bmatrix} R_x R_y \\ R_x R_y \\ R_x R_y \\ R_x R_y \end{bmatrix} + \begin{bmatrix} -d_2 & d_4 \\ -(d_2 + d_3)d_4 \\ d_2 & d_4 \\ (d_2 + d_3)d_4 \end{bmatrix} \cdot \begin{bmatrix} \cos\beta & -\sin\beta \\ \sin\beta & \cos\beta \end{bmatrix}$$

The above points are then translated to the picture plane, and F and H are connected by straight lines to the horizon. A similar equation applies to points MLKJ of FIG. 7 with M and J connected to the horizon.

To calculate the projected touchdown point, it is assumed that the velocity vector remains constant. In this case, the time until ground contact for a descending aircraft can be computed from the z-velocity. If h is the present altitude, then the projected time to ground contact is (for $V_z > 0$)

$$t = h/V_z$$

The projected x-y touchdown location in the ground plane is $$T_x = V_x t = hV_x/V_z$$

$$T_y = V_y t = hV_y/V_z$$

Knowing the position of the projected touchdown point, the drawing of the dotted indicator lines at the ends of the horizon is readily accomplished. The displacement of the end points of the touchdown indicator from the horizon at the vertical edges of the display is controlled by the glide slope input. The standard glide slope indicator has a horizontal hair line which rises above the center of the instrument (center representing aircraft position) when the aircraft falls below the glide slope beam. The drive signal for this instrument can be converted to a digital input which in turn generates displacements from the horizontal. FIG. 7 indicates how the glide slope indicator signal is related to the integrated aircraft display. Note that this picture corresponds to position 6 in FIG. 2b and, although the altitude is too low, the pitch angle is such that the runway would be overshot. The pilot thus must correct both pitch and altitude to stay in the proper glide slope position (a roll correction is also needed).

The aircraft symbol, plan view velocity vector and acceleration curvature symbol generation may be developed mathematically as subsequently shown. The aircraft symbol is centered and pictured at some convenient reference point on the display. To produce the symbol of FIG. 1b, the horizontal position can readily be envisioned as five (5) straight line segments on each side of the origin as shown in FIG. 8a. The letters used to label the aircraft symbol in FIG. 8 should not be confused with those used to label the runway corners.

The aircraft roll or rotation for the symbol may then be generated as follows with reference to FIG. 8(b). The point A in the display has coordinates $A_x A_z$. The computer obtains the roll angle, $\gamma$ from the altitude reference gyro. To rotate the aircraft symbol through the angle $\gamma$, the computer performs the following matrix transformation:

$$\begin{bmatrix} A'_x A'_z \\ B'_x B'_z \\ C'_x C'_z \\ D'_x D'_z \\ E'_x E'_z \end{bmatrix} = \begin{bmatrix} A'_x A'_z \\ A'_x A'_z \\ C'_x C'_z \\ D'_x D'_z \\ E'_x E'_z \end{bmatrix} \cdot \begin{bmatrix} \cos\gamma & \sin\gamma \\ -\sin\gamma & \cos\gamma \end{bmatrix}$$

The left half of the aircraft symbol is obtained with a similar set of operations. The CRT produces the symbol by connecting the sequence of primed letter points. The velocity vector is represented by the $V_x$ and $V_y$ velocity components seen as if an observer were now looking down from a position directly above the aircraft (plan view). Given $V_x$ and $V_y$, and starting with point A in the aircraft symbol, the CRT is directed to project a straight line from point A which has CRT reference points ($A_x$, $A_z$) to a point given by ($A_x + K_i V_x$, $A_z + K_i V_y$). Here K; is a scaling factor relating velocity to distance on the CRT. FIG. 9 provides the details of the vector display and assumes $K_i = 1$ for simplicity in the equations.

The marker curvature to indicate acceleration can be made constant with the length of arc proportional to lateral acceleration $a_x$. This is illustrated in the example of FIG. 9(a) and is also implemented in the sample computer program for generating the display.

Assuming $\rho$ = fixed constant and $\alpha = K_x a_x$ where $K_x$ is a scaling constant, the equations for an unrotated system are as follows:

distance $AP = [V_x^2 + V_y^2]^{\frac{1}{2}}$ distance AS = desired airspeed = $V_d$ distance SM = Half cross width = $k_1$

| Point A: | $A'_x = 0$ | $A'_z = 0$ |
|---|---|---|
| S: | $S'_x = 0$ | $S'_z = V_d$ |
| P: | $P'_z$ 0 | $P'_z = [V_x^2 + V_y^2]^{\frac{1}{2}} = V_a$ |
| O: | $O'_x = \rho$ | $O'_z = V_a$ |
| Q: | $Q'_x = \rho(1 - \cos\alpha)$; | $Q'_z = V_a + \rho\sin\alpha$ |
| M: | $M'_x = k_1$ | $M'_z = V_d$ |
| N: | $N'_x = k_1$ | $N'_z = V_d$ |

Arc PQ is drawn as a sequence of points given by:

$(Wi)_x' = \rho(1 - \cos(\alpha/n)i)$ $(Wi)_z' = V_a + \rho\sin(\alpha/n)i$ where i = 0 to n.

After rotation to position $\theta = \tan^{-1}(V_x/V_y)$ the equations in the matrix form are as follows:

$$\begin{bmatrix} A'x' & A'z' \\ A'x' & S'z' \\ M'x' & M'z' \\ N'x' & N'z' \\ P'x' & P'z' \\ W'ix' & W'iz' \\ Q'x' & Q'z' \end{bmatrix} = \begin{bmatrix} A'x' & A'z' \\ S'x' & S'z' \\ M'x' & M'z' \\ N'x' & N'z' \\ P'x' & P'z' \\ W'ix' & W'iz' \\ Q'x' & Q'z' \end{bmatrix} \cdot \begin{bmatrix} \cos\theta & \sin\theta \\ \sin\theta & \cos\theta \end{bmatrix}$$

(W'ix', W'iz') is the set of points representing W moving along arc PQ.

An exemplary program for the Hewlett-Packard 9830 desk top computer is developed as follows by using the equation developed above. The first part of the program sets up the data using assignment or input statements. Then the equations which are described in the analysis are used to generate the display on the plotter. Finally, each graph is labeled with the corresponding constants.

The general structure of the program is as follows:

| Lines | Description |
|---|---|
| 20–270 | input and definition of constants |
| 2000–2730 | draw frame, airplane symbol and related indicators |
| 2200 | airplane symbol at roll angle |
| 2495 | velocity indicator |
| 2570 | acceleration indicator (return to 290) |
| 330–1690 | draw runway and related indicators |
| 330 | descent marker and dashed center line |
| 690 | runway corners |
| 960 | desired touchdown point indicator |
| 1400 | indicator for projected touchdown point |
| 3000–3060 | subroutine to find coordinates of projection points |
| 3100–3370 | labeling the display |

The equations from the analysis are used in the following manner:

The general point-by-point mapping equations (2) listed earlier are used in lines 3020, 3030 (subroutine); Equations $T_x = K(V_x/V_z)$ $T_y = K(V_y/V_z)$ are used in lines 1420, 1430. Equations $$[T_x, T_y] = [T_x, T_y] \cdot \begin{bmatrix} \cos\gamma & \sin\gamma \\ \sin\gamma & \cos\gamma \end{bmatrix}$$

are used in lines 2330, 2340, 2450, 2460.

The actual program listing is as follows:

```
30 DIM X[15],Y[15]
40 REM H = ALTITUDE 3000 FT = .568 MI
50 HI = 2800
60 H = MI/528
70 REM L RUNWAY LENGTH
80 L = 1
90 REM DESCENT MARKER
100 L1 = 1.5
110 REM K0 DISTANCE OF PP FROM VIEWING POINT
120 K0 = 1
130 DEG
```

```
140 DISP "AIRPL HDC IN DEG FR NTH";
150 INPUT T
160 DISP "RUNWAY HDG IN DEG FR NTH";
170 INPUT A
180 DISP "AIRPLANE ROLL ANGLE";
190 INPUT G
200 DISP "COORDINATES OF REF POINT";
210 INPUT X0,Y0
220 DISP "COORDS OF VEL VECTOR";
230 INPUT V1,V2,V3
240 REM DESIRED SPEED 1.5
250 V=1.5
260 DISP "D=PROPORTIONAL TO ACCEL, IN DEG";
270 INPUT D
280 GOSUB 2000
290 REM IF USING LINE 180, ADD THE SAME TO ALL YS
300 Y0=Y0+0.5
310 K1=7
320 K2=7
330 REM DISTANCE TO RUNWAY
340 C=COS(A−T)
350 S=SIN(A−T)
360 REM DRAW CENTER LINE OF RUNWAY
370 X=X0
380 Y=Y0
390 GOSUB 3000
400 PEN
410 X2=X1
420 Y2=Z1
430 X=X0+L*S
440 Y=Y0+L*C
450 GOSUB 3000
460 X3=X1
470 Y3=Z1
480 IF Y0−0.5> = L1 THEN 530
490 REM DASHED CENTER LINE
500 M1=(X3−X2)/8
510 M2=(Y3−Y2)/8
520 FOR I=−7 TO 7
530 X=X2+I*M1
540 Y=Y2+I*M2
550 PLOT X,Y,−2
560 PLOT X+0.3*M1,Y+0.3*M2,−1
570 NEXT I
580 GOTO 690
585 REM DESCENT MARKER
590 X=X0−L1*S
600 Y=Y0−L1*C
610 GOSUB 3000
620 PLOT X1,Z1,−2
630 LABEL (*) "0"
635 M1=(X3−X1)/12
637 M2=(Y3−Z1)/12
640 FOR I=0 TO 12
650 X=X1+I*M1
660 Y=Z1+I*M2
670 PLOT X,Y,−2
675 PLOT X+0.5*M, Y+0.5*M2,−1
680 NEXT I
690 REM FIND COORD OF RUNWAY CORNERS
700 REM RUNWAY WIDTH 100 FT. = .01894 MI IN REALITY
702 IF Y0< = 2 THEN 710
704 W=0.2
706 GOTO 720
710 W=0.1
720 REM CORNERS
730 C=C0 (A-T)
740 S=SIN(A-T)
750 N=1
760 FOR J=0 TO 1
770 I=1−2*J
780 X=X0+I*(0.5)*W*C+J*8*S
790 Y=Y0−I*(0.5)−D+S+J*C*L
800 X[H]=X
810 Y[H]=Y
820 GOSUB 3000
830 PLOT X1,Z1,−2
840 IF J=0 AND I=−1 THEN 890
850 IF J=1 AND I=1 THEN 890
860 I=2*J−1
870 N=N+1
880 GOTO 780
890 N=N +1
900 NEXT J
910 X=X[1]
920 Y=Y[1]
930 GOSUB 3000
940 PLOT X1,Z1,−1
950 PEN
960 REM DESIRED TOUCHDOWN PT
970 REM AT DISTANCE D FROM RO
980 REM L2=200 FT=APPR .04 MI
990 L2=0.04
1000 X=X0+L2*S
1010 Y=Y0+L2*C
1020 GOSUB 3000
1030 X[10]=X1
1040 Y[10]=Z1
1050 X=X0+L2*S−W/2*0.75*C
1060 Y=Y0+L2*C+W/2*0.75*S
1070 GOSUB 3000
1080 PLOT X1,Z1,−2
1090 X=X0+L2*S−W*0.625*C
1100 Y=Y0+L2*C+W+0.625*S
1110 GOSUB 3000
1120 PLOT X1,Z1,−1
1130 X[11]=X1
1140 Y[11]=Z1
1150 M1=−(X[11]+2)/8
1160 FOR I=0 to 7
1170 X=X[11]+I*M1
1180 Y=Y[11]−I*Y 11 /8
1190 PLOT X,Y,−2
1120 PLOT X+0.5* 1,Y−0.5*Y[11]/8,−1
1210 NEXT I
1220 X=X0+L2*S+W/2*0.75*C
1230 Y=Y0+L2*C−W/2*0.75*S
1240 GOSUB 3000
1250 PLOT Z1,Z1,−2
1260 X=X0+L2*S+W*0.625*C
1270 Y=Y0+L2*C−W*0.625*S
1280 GOSUB 3000
1290 PLOT X1,Z1,−1
1300 X[12]=X1
1310 Y[12]=Z1
1320 M1=(2−X[12])/8
1330 M2=−Y[12]/8
1340 FOR I=0 TO 7
1350 X=X[12]+I*M1
1360 Y=Y[12]+I*M2
1370 PLOT X,Y,−2
1380 PLOT X+0.5*M1,Y+0.5*M2,−1
1390 NEXT I
1400 REM TOUCHDOWN AT PRESENT SPEED
1410 REM ADD SAME DIST AS IN 180
1415 IF V3=0 THEN 1620
1420 X=H*V1/V3
1430 Y=H*V2/V3
1440 Y=Y+0.5
1450 GOSUB 3000
1460 PLOT X1−0.01,Z1−0.01,−1
1470 LABEL (*)"T"
1480 X9=X
1490 X9=Y
1500 FOR J=−1 TO 1 STEP 2
1510 X=X9+J*W*0.375*C
1520 Y=Y9−J*W*0.375*S
1530 GOSUB 3000
1540 PLOT X1,Z1,−2
1560 X=X9+J*0.12*C
1570 Y=Y9−J*W*0.12*S
1580 GOSUB 3000
1590 PLOT X1,Z1,0
1600 PLOT J*2,0,−1
1610 NEXT J
1620 PEN
1630 GOTO 3100
1640 DISP "LEVEL FLIGHT"
1690 GOTO 1630
2000 REM FILE 3 SUB FOR FRAME AND HORIZON
2010 REM LOWER,UPPER CORNER .5 INCH
2020 SCALE −2.25,4.75,0,5
2030 REM FRAME
2040 PEN
```

-continued

```
2050 PLOT -2,0.5,1
2060 IPLOT 4,0,2
2070 IPLOT 0,4,2
2080 IPLOT -4,0,0
2090 IPLOT 0,-4,-1
2100 REM HORIZON
2110 IPLOT 0,3.5,-2
2120 IPLOT 4,0,-1
2130 OFFSET 0,1
2210 DIM P[4,2]
2220 P[1,1]=0.4
2230 O[1,2]=0
2240 P[2,1]=0.1
2250 P[2,2]= -0.125
2260 P[3,1]=0.1
2270 P[3,2]=0.125
2280 P[4,1]=0.4
2290 P[4,2]=0
2300 FOR I=1 TO 4
2310 X=P[I,1]/2
2320 Y=P[I,2]
2330 X[I]=X*COS(G)+Y*SIN(G)
2340 Y[I]= -X*SIN(G)+Y*COS(G)
2350 NEXT I
2360 PLOT 0,0,-2
2370 FOR I=1 TO 4
2380 IPLOT X[I],Y[I]
2390 NEXT I
2400 PEN
2410 PLOT 0,0,-2
2420 FOR I=1 TO 4
2430 X= -P[I,1]/2
2440 Y=P[I,2]
2450 X[I]=X*COS(G)+Y*SIN(G)
2460 Y[I]= -X*SIN(G)+Y*COS(G)
2470 IPLOT X[I],Y[I]
2480 NEXT I
2490 PEN
2495 REM VELOCITY INDICATOR
2500 PLOT 0,0,-2
2510 IPLOT V1/4,V2/4,-1
2520 B=ATN(V1/V2)
2530 C1=COSB
2540 S1=SINB
2550 V4=SQR(V1*V1+V2*V2)
2570 REM ACCEL INDICATOR
2580 R=0.15
2590 IF D=0 THEN 2700
2600 D2=ABS(D)
2610 FOR D1=0 TO D2 STEP 15
2620 X=SGN(D*R*(1-COS(D1))*C1+(V4/4+R*SIN(D1))*S1
2630 Y= -SGN(D)*R*(1-COS(D1))*S1+(V4/4+R*SIN(D1))*C1
2650 PLOT X,Y,-2
2660 NEXT D1
2670 PEN
2700 PLOT V*S1/4+0.1*C1,V*C1/4-0.1*S1,-2
2710 PLOT V*S1/4-0.1*C1,V*C1/4+0.1*S1,-1
2720 OFFSET 0,4
2730 RETURN
3000 REM SUBSUB TO FIND PROJ COORD
3010 IF Y=0 THEN 3050
3020 X1=X/Y*K0*K1
3030 Z1= -H/5*K0*K2
3040 GOTO 3060
3050 DISP "Y=0"
3060 RETURN
3100 REM LABELS
3110 PLOT 2,1,0.4,-1
3120 LABEL (*)"AIRPL HDNG DEG ="T
3130 PLOT 2.1,0.2,-1
3140 LABEL (*)"RWY HDNG DEG ="A
3150 PLOT 2.1,0,-1
3155 LABEL (*)"REF POINT"X0;",",Y0-0.5
3158 PLOT 2.1,-0.2,-1
3160 LABEL (*)"DIST TO RWAY IN MI ="Y0-0.5
3170 PLOT 2.1,-0.4,-1
3180 LABEL (*)"AIRPL ROLL ANGLE DEG ="G
3190 PLOT 2.1,-0.6,-1
3200 LABEL (*)"ALTITUDE FT ="H1
3210 PLOY 2.1,-0.8,-1
3220 LABEL (*)"RWAY LENGTH MI ="L
3230 PLOT 2.1,-1,-1
3240 LABEL (*)"K0 ="K0;"K1 ="K1;"K2 ="K2
3250 PLOT 2.1,-1.2,-1
3260 LABEL (*)"V1 ="V1;"V2 ="V2;"V3 ="V3
3270 PLOT 2.1,-1.4,-1
3272 LABEL (*)"DESIRED SPEED ="V
3275 PLOT 2.1,-1.6,-1
3280 LABEL (*)"LATERAL ACCELERATION";D
3290 PLOT 2.1,-1.8,-1
3300 LABEL (*)"(D<0 TO THE LEFT)"
3310 PLOT 2.1,-2,-1
3315 IF V3#0 THEN 3320
3316 LABEL (*)"LEVEL FLIGHT"
3317 GOTO 3350
3320 LABEL (*)"T TOUCHDOWN AT PRESENT SPEED"
3325 FORMAT F6.3,F6.3
3330 PLOT 2.1,-2.2,-1
3340 LABEL (3325)X9,Y9-0.5
3350 PLOT 2.1,-2.4,-1
3360 LABEL (*)"0 DESCENT MARKER"
3370 END
```

Exemplary graphical displays which were generated by making arbitrary choices for the input variables are set forth in FIGS. 10-14. The given speeds are all relative and have to be scaled appropriately to make them more realistic.

For FIG. 10, airplane heading and runway heading are off by 2°, which does not make a significant difference at this assumed distance (5 mi.). The airplane is not heading directly for the reference point (XO=0.2 instead of=0), which displaces the latter slightly to the right of center of the display. The airplane is banked to the left (roll angle= -5°). The speed indicator points somewhat to the right (-10° to the left) is too small to show up on the acceleration indicator. The projected touchdown indicator (T) is displaced to the right (because $V_x$=0.2) and shows that the plane is descending too fast and would land 2.273 miles before the runway.

For FIG. 11, airplane heading and runway axis differ by 30°, the airplane is flying parallel to the ground (no touchdown indicator), and banked to the right (roll angle=5°). It is flying somewhat faster (1.8) than the desired speed; and there is a crosswind which shows up as a curve to the left on the acceleration indicator.

For FIG. 12, airplane heading and runway axis differ by 2°, which shows up as a slight angular displacement of the runway center line. The airplane is banked to the right and is too fast (1.5); there is a crosswind to the left, which shows up as the curved acceleration indicator. The airplane is descending too fast and too far to the right, which displaces the touchdown indicator to the right of and in front of the runway.

For FIG. 13, airplane and runway are lined up correctly, but the airplane is too fast (1.5), and there is a crosswind to the left. In addition, the descent is too fast and the projected touchdown point T is too far and off the runway.

For FIG. 14, airplane and runway are lined up correctly. The airplane speed is correct (velocity indicator ends at the crossbar). The descent is a little too fast, but the projected touchdown point T is only slightly behind the desired touchdown point.

While a particular embodiment of the invention has been shown and described, it will be obvious to those skilled in the art that changes and modifications may be made therein without departing from the invention in its broader aspects and, therefore, the object in the appended claims is to cover all such changes and modifications which fall within the true spirit and scope of the invention.

I claim:

1. A system for presenting a cockpit display providing guidance information for landing an aircraft on a runway in conditions of low visibility, comprising:
a display device visible to the pilot;
means for generating on said display device a horizons reference line having a generally fixed horizontal configuration;
means for generating an aircraft symbol on said device, said aircraft symbol having an orientation with respect to said reference line corresponding to the orientation of the aircraft with respect to the actual horizon;
means for generating on said display device a runway symbol having an orientation with respect to the aircraft symbol indicative of the orientation of the actual runway with respect to the aircraft; and
means for generating a generally V-shaped descent profile vector extending from respective sides of the display towards a location on the projected flight path of the aircraft indicative of the projected landing point of the aircraft.

2. A landing display system as described in claim 1 wherein aircraft symbol further comprises a velocity vector having a direction indicative of the course of the aircraft with respect to the center line of the runway.

3. An aircraft display system as defined in claim 2 wherein said runway symbol includes a center line projection extending across the projected flight path depicted for said aircraft symbol.

4. A blind landing display system as defined in claim 3 wherein said velocity vector includes a tip portion indicative of the rate of change of said vector.

5. A blind landing system as defined in claim 1 wherein said descent profile vector includes at a disjunctive central portion thereof a tip portion indicating rate of change of the descent profile.

6. A blind landing display system as defined in claim 1 which further includes the generally V-shaped descent profile vector extending from either end of said horizon reference line.

7. A blind landing display system for assisting the pilot of an aircraft in landing on a runway in poor visibility conditions, comprising:
a display device in view of the pilot;
means for generating on said display device a horizon reference line having a generally fixed horizontal relationship with respect to said device;
means for generating an aircraft symbol on said display device having an orientation with respect to said horizon reference line corresponding to the relationship between the aircraft and the actual horizon;
means for generating a runway symbol on said display device below the horizon reference line having an orientation with respect to said aircraft symbol generally corresponding to the visual orientation of the actual runway as viewed from the aircraft, said runway symbol including an extended center line;
means for generating a velocity vector extending from said aircraft symbol indicative of the projected flight path of the aircraft with respect to said extended center line; and
means for generating a generally disjointed V-shaped descent profile symbol extending from either side of said display to indicate the projected landing point of the aircraft with respect to said runway.

8. A blind landing display system as defined in claim 7 including means for generating an additional descent profile indicative of the desired descent path and touchdown point of the aircraft with respect to said runway.

9. A blind landing display system as defined in claim 8 wherein the slope of said descent profile symbol is less than the slope of said desired profile when said aircraft is descending along a profile shallower than the desired profile, and wherein the slope of said descent profile symbol is steeper than said desired descent profile when said aircraft is descending more steeply than said desired descent profile.

10. A blind landing display system as defined in claim 9 wherein said descent profile symbol includes a tip portion indicative of the rate of change of the rate of descent of the aircraft.

11. A blind landing display system as defined in claim 9 wherein said velocity vector includes a tip portion indicative of the lateral acceleration of the aircraft with respect to the center line of said runway.

* * * * *